US012632309B1

(12) United States Patent
Draayer et al.

(10) Patent No.: US 12,632,309 B1
(45) Date of Patent: May 19, 2026

(54) RESOURCE TRANSMISSION BASED ON TIME INTERVALS

(71) Applicant: Citibank, N.A., New York, NY (US)

(72) Inventors: Michael Draayer, Sioux Falls, SD (US); Stephanie G. Smith, Sioux Falls, SD (US); Shankar Ramachandran, Frisco, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/274,175

(22) Filed: Jul. 18, 2025

(51) Int. Cl.
*G06F 9/50* (2006.01)

(52) U.S. Cl.
CPC .......... *G06F 9/5038* (2013.01); *G06F 9/5061* (2013.01)

(58) Field of Classification Search
CPC .............................. G06F 9/5038; G06F 9/5061
See application file for complete search history.

(56) References Cited

U.S. PATENT DOCUMENTS

| | | | | |
|---|---|---|---|---|
| 7,640,547 | B2 * | 12/2009 | Neiman ................. | G06Q 10/02 705/5 |
| 8,504,691 | B1 * | 8/2013 | Tobler ..................... | H04L 47/70 709/224 |
| 8,782,654 | B2 * | 7/2014 | Jackson ................ | G06F 9/5038 718/104 |
| 10,200,246 | B1 * | 2/2019 | Rachamadugu | .... H04L 41/0846 |
| 10,678,528 | B1 * | 6/2020 | Acheson .................. | G06F 8/65 |

| | | | | |
|---|---|---|---|---|
| 10,855,751 | B2 * | 12/2020 | Corley ..................... | G06F 21/62 |
| 10,893,051 | B2 * | 1/2021 | Choyi ................... | H04L 63/101 |
| 11,074,110 | B1 * | 7/2021 | Vatidis .................. | G06F 9/5038 |
| 11,625,271 | B2 * | 4/2023 | Di Cairano-Gilfedder ................. G06F 9/5011 718/104 |
| 11,929,932 | B1 * | 3/2024 | Haefele ............... | H04L 43/0876 |
| 12,149,453 | B1 * | 11/2024 | Moshyedi ............. | H04L 47/826 |
| 2003/0154112 | A1 * | 8/2003 | Neiman ................ | G06F 9/5044 705/5 |
| 2003/0236854 | A1 * | 12/2003 | Rom ...................... | H04L 47/824 709/217 |
| 2005/0055694 | A1 * | 3/2005 | Lee ........................ | G06F 9/4881 718/100 |
| 2006/0212334 | A1 * | 9/2006 | Jackson ................ | H04L 67/125 709/226 |
| 2008/0082979 | A1 * | 4/2008 | Coppinger ............ | G06F 9/5033 718/102 |

(Continued)

*Primary Examiner* — Benjamin C Wu
(74) *Attorney, Agent, or Firm* — Perkins Coie LLP

(57) ABSTRACT

Systems and methods for time-based resource allocation are disclosed herein. A system receives requests for intermediate allocation of a set of resources during a first period of time. Each request may include a target entity to receive a portion of the intermediate allocation and a user-linked resource token. The system determines a first subset of the set of resources for which a final allocation of resources from the user is requested when the first period is elapsed. During the first period, the system transfers the set of resources to target entities. During a second period, the system receives a message from a target entity indicating a return of at least a portion of the intermediate allocation. The system updates the set of resources and calculates an updated first subset of resources. Responsive to determining that the second period is elapsed, the system may automatically transmit a resource allocation command configured to trigger final allocation.

17 Claims, 7 Drawing Sheets

(56) References Cited

U.S. PATENT DOCUMENTS

| | | | |
|---|---|---|---|
| 2010/0120359 A1* | 5/2010 | Agarwal | H04B 7/18539 |
| | | | 455/12.1 |
| 2010/0153963 A1* | 6/2010 | Kakarlamudi | G06F 16/217 |
| | | | 707/E17.014 |
| 2011/0252166 A1* | 10/2011 | Padala | G06F 3/061 |
| | | | 710/74 |
| 2013/0086235 A1* | 4/2013 | Ferris | G06F 9/505 |
| | | | 709/223 |
| 2013/0160018 A1* | 6/2013 | Kang | G06F 9/50 |
| | | | 718/103 |
| 2014/0019708 A1* | 1/2014 | Erdmann | G06F 12/0284 |
| | | | 711/E12.002 |
| 2015/0199208 A1* | 7/2015 | Huang | G06F 9/5005 |
| | | | 718/1 |
| 2015/0339146 A1* | 11/2015 | Ponsford | G06F 9/5077 |
| | | | 718/1 |
| 2016/0277308 A1* | 9/2016 | Challa | G06F 9/5077 |
| 2018/0074864 A1* | 3/2018 | Chen | G06F 9/5016 |
| 2019/0028456 A1* | 1/2019 | Kurian | H04L 63/10 |
| 2019/0132249 A1* | 5/2019 | Smith | G06F 13/36 |
| 2019/0391980 A1* | 12/2019 | Mundar | G06F 9/50 |
| 2020/0302431 A1* | 9/2020 | Polehn | H04L 9/3213 |
| 2021/0373955 A1* | 12/2021 | Galles | G06F 12/0284 |
| 2021/0390481 A1* | 12/2021 | Wertheimer | H04L 47/762 |
| 2022/0222648 A1* | 7/2022 | Frick | G06Q 20/321 |
| 2022/0239607 A1* | 7/2022 | Jackson | H04L 47/83 |
| 2023/0289724 A1* | 9/2023 | Halbfinger | G06Q 10/087 |
| 2023/0308235 A1* | 9/2023 | Rodriguez | H04R 27/00 |
| 2024/0220833 A1* | 7/2024 | Lee | G06N 7/00 |
| 2024/0305567 A1* | 9/2024 | Haefele | H04L 47/125 |
| 2025/0165304 A1* | 5/2025 | Karloff | G06F 9/5072 |

* cited by examiner

200

```
intermediateAllocationRequest: {
    "proxyUserId": "thisisjohndoe",
    "resourceToken": "token-jd1111",
    "requestTime": "2025-04-11T09:00:00Z",
    "targetEntityId": "entity-A",
    "requestedResource": ["compute_node", "compute_node", \
                          "compute_node", "compute_node", \
                          "compute_node", "compute_node"]
```

```
subsetDetermination(requestedResource, requestTime, resourceToken, timePeriod){
    numberResources = length(requestedResource);
    firstSubset = requestedResource[:: (numberResources/3)]
    secondSubset = requestedResource[(numberResources/3)+1::]

if time >= (requestTime + timePeriod):
        resourceToken.resources += firstSubset
```

```
returnMessage {
    entity: "entity-A"
    returnedResource: ["compute_node"]
    resourceToken: "token-jd1111"
}
```

*FIG. 3B*

```
setUpdate(returnedResource, firstSubset, secondSubset, requestedResource){
    for resource in returnedResource: requestedResource.remove(resource);
    firstSubset = requestedResource[:: (numberResources/3)]
    secondSubset = requestedResource[(numberResources/3)+1::]
}
```

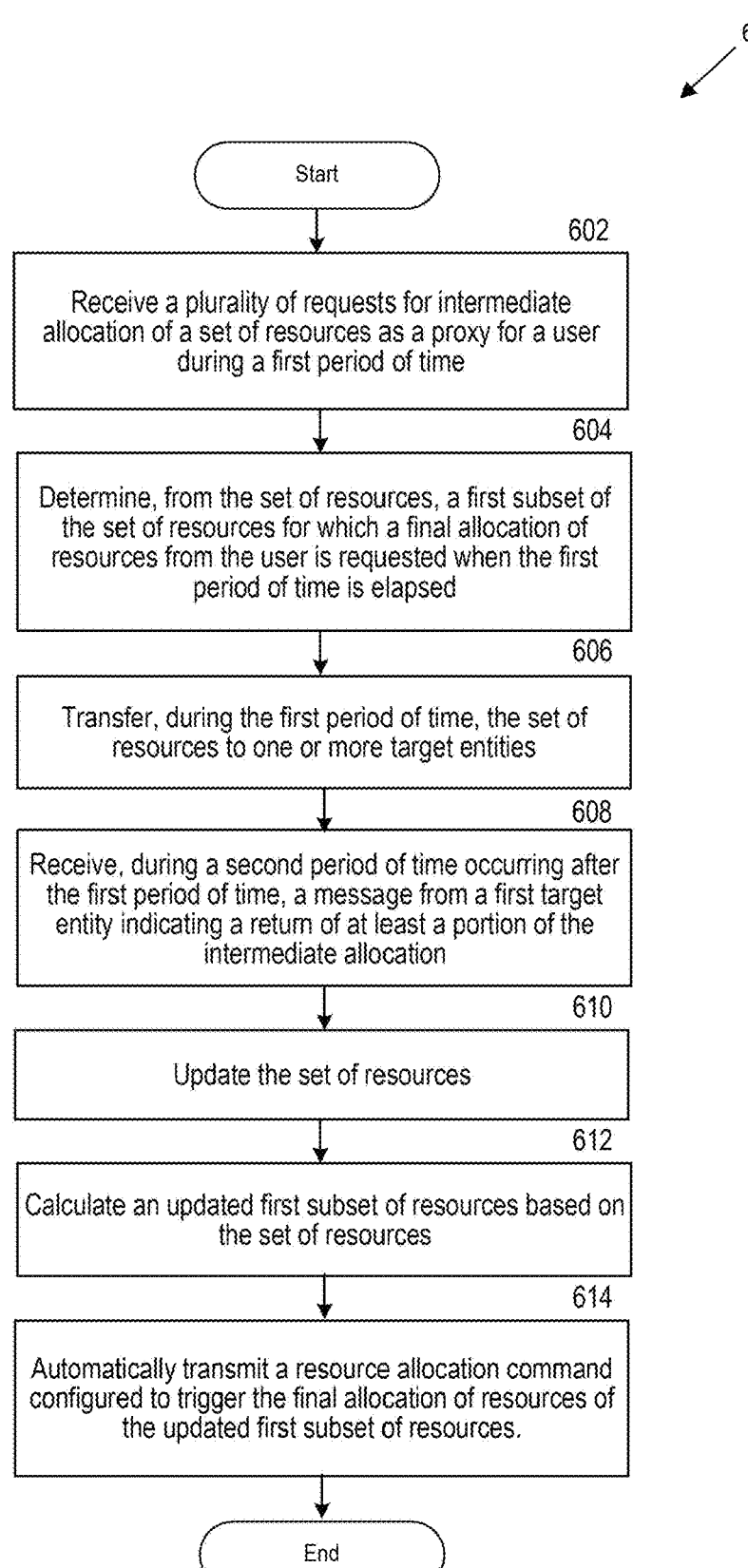

600

Start

602

Receive a plurality of requests for intermediate allocation of a set of resources as a proxy for a user during a first period of time

604

Determine, from the set of resources, a first subset of the set of resources for which a final allocation of resources from the user is requested when the first period of time is elapsed

606

Transfer, during the first period of time, the set of resources to one or more target entities

608

Receive, during a second period of time occurring after the first period of time, a message from a first target entity indicating a return of at least a portion of the intermediate allocation

610

Update the set of resources

612

Calculate an updated first subset of resources based on the set of resources

614

Automatically transmit a resource allocation command configured to trigger the final allocation of resources of the updated first subset of resources.

End

*FIG. 6*

RESOURCE TRANSMISSION BASED ON TIME INTERVALS

BACKGROUND

In distributed computing environments, load balancing is essential for distributing workloads and resource requests among multiple entities, such as servers or computing nodes, to ensure optimal performance and reliability. As systems become more complex and user demands fluctuate rapidly, it becomes increasingly challenging to efficiently allocate and provision resources in a way that matches real-time needs. This challenge can lead to inefficiencies, such as resource waste, delayed processing, or bottlenecks, especially when entities must coordinate over limited time windows and dynamic workloads.

SUMMARY

Accordingly, a mechanism is disclosed herein for time-based, multi-phase resource allocation and provisioning among multiple entities. A time-based allocation system may be used to perform the operations described herein. In particular, a communication subsystem may receive a plurality of requests for intermediate allocation of a set of resources as a proxy for a user during a first period of time. Each request in the plurality of requests may include a corresponding target entity to receive different portions of the intermediate allocation and a user-linked resource token.

One example environment may include a resource management system that interfaces with a variety of entities requiring dynamic allocation of resources. For instance, a user device or application may submit requests for temporary allocation of resources to support specific operations or tasks. The communication subsystem aggregates these requests and, during the first period of time, coordinates the intermediate allocation of resources to various target entities, such as processing units, storage modules, or service endpoints. Each target entity receives a portion of the resources in its associated storage or operational environment, as specified in the corresponding request.

For example, a first user may require a set of resources such as compute nodes, Graphics Processing Unit (GPUs), and virtual machines (VMs) to perform tasks at a plurality of applications (e.g., at different entities), but may not immediately have enough resources available to run the tasks, although the system may anticipate upcoming future availability of compute nodes, GPUs, or VMs of the user. The system, acting as a proxy, receives requests to temporarily allocate the requested resources from a shared pool to the target jobs and entities on the user's behalf, using a user-linked resource token for tracking. In this way, many time-sensitive tasks can be performed immediately without delay or lag. Especially where tasks include patching security flaws, any delay or lag in handling can expose systems to significant risks and potential exploitation, making immediate action essential.

The system may determine a first subset of the set of resources for which a final allocation of resources from the user is requested when the first period of time is elapsed. In many cases, the user's own resources may become available before the tasks are completed on the intermediately allocated resources. In order to ensure continued availability of the shared pool of resources, the system may require the user to provide a portion of the user's own resources after a period of time such that it may become available for others to use.

During a second period of time, which occurs after the first period, the communication subsystem may receive a message from a first target entity indicating a return of at least a portion of the intermediate allocation from the entity-associated storage to the user-linked resource token (e.g., either from completion of the task or because it was simply not needed). This enables the system to reclaim unused or surplus resources, thereby improving overall resource utilization and reducing waste. The intermediately allocated set of resources may be updated by removing the resources that have been returned by the first target entity. The system may then recalculate an updated first subset of resources based on the revised set.

Responsive to determining that the second period of time has elapsed, a final allocation subsystem automatically transmits a resource allocation command configured to trigger the final allocation of resources of the updated first subset. This command causes the transmission of resources from a user storage associated with the user-linked resource token to the appropriate target entities, thereby finalizing the allocation process. In this way, the user provides its own resources to be used by the system and/or other entities while the tasks are performed on the intermediately allocated resources. By utilizing the multi-phase allocation techniques described herein, multiple entities can share resources and perform tasks without delay or lag and also balance load among resources available across users and entities to handle more tasks at a given time.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates an exemplary request for intermediate resource allocation, in accordance with one or more embodiments of this disclosure.

FIG. 3A illustrates an exemplary process for determining subsets of the intermediate resource allocation, in accordance with one or more embodiments of the disclosure.

FIG. 3B illustrates an exemplary message indicative of a return of allocated resources, in accordance with one or more embodiments of the disclosure.

FIG. 6 is a flowchart of operations for time-based resource allocation, in accordance with one or more embodiments of this disclosure.

DETAILED DESCRIPTION

Figure 1:
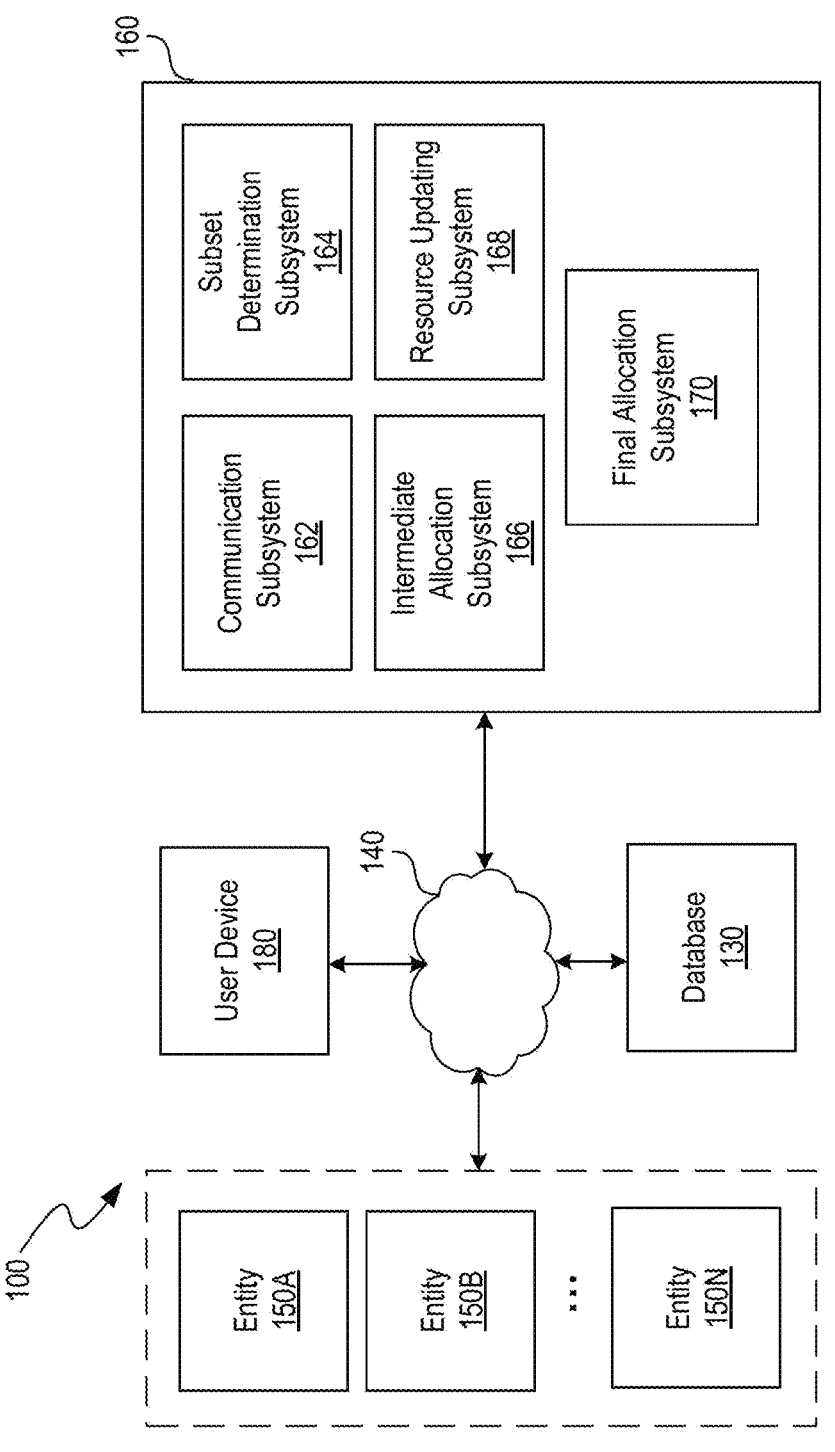
FIG. 1 shows an illustrative system for time-based resource allocation, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Attempting to create a process to enable dynamic load balancing across different entities that would both provide availability of resources and minimize latency in view of the available conventional approaches created significant technological uncertainty. Creating such a platform required addressing several unknowns in conventional approaches in dynamic resource management, such as how to ensure high availability of resources and reclaim resources in real time across multiple users and entities without causing resource contention or delay. Similarly, conventional resource allocation methods did not address situations where entities or tasks request more resources than they ultimately need-such as anticipating a higher demand for GPUs-nor did they provide mechanisms for promptly reclaiming and redistributing unused resources, which is critical in environments with fluctuating resource availability and urgent operational requirements.

Conventional approaches rely on predefined, static allocation models or manual provisioning, which do not support dynamic, time-based, or multi-phase allocation and reclamation of resources. For example, a conventional system may allocate resources to a single entity for a fixed period, and fail to reclaim or redistribute unused resources efficiently, leading to underutilization and increased latency for time-sensitive tasks. Conventional approaches typically involve manual intervention or rigid scheduling, which cannot adapt to real-time changes in resource demand or availability, nor can they support proxy-based allocation on behalf of users. Conversely, the disclosed system enables automated, time-based, multi-phase allocation and reclamation of resources, allowing for immediate fulfillment of requests, efficient resource utilization, and support for critical, time-sensitive operations such as security patching.

The system not only allows users to promptly access shared resources and contribute their own when available—including allocating only a portion of their resources so that they can retain some for their own operations—but also introduces the challenge of determining how the subsequent return of borrowed resources impacts the user's obligation to share resources back to the pool. Specifically, when users receive intermediate allocations to address immediate needs, the process for reclaiming and redistributing those resources introduced further technological uncertainty.

Legacy resource management systems were not designed to support dynamic, partial, or intermediate allocations, nor to address the complexities that arise when users must return borrowed resources to the pool. This challenge is particularly acute when the timing and amount of resource reclamation directly affect what, and how much, a user is required to contribute back, especially in exchange for having received an intermediate allocation to fulfill urgent or immediate tasks. Traditional static allocation models often failed to account for these nuanced, reciprocal sharing arrangements, resulting in inefficient resource utilization. To address these issues and enable seamless, equitable multi-phase allocation and reclamation, the system must incorporate mechanisms for real-time resource tracking, flexible allocation policies, and automated protocols for managing the return and redistribution of resources among multiple entities and heterogeneous environments.

To overcome the technological uncertainties, the inventors systematically evaluated multiple design alternatives. For example, the inventors experimented with various architectures for resource custodianship to minimize latency in provisioning entities with resources so that tasks could be performed without perceivable delay as well as to minimize the number of payloads sent between entities, users, and systems to minimize weak points for sensitive data breach. For example, by using a central system from which resources are intermediately allocated and to which resources are finally allocated, the techniques minimize communication and coordination between the different users and entities.

Furthermore, using a central system to coordinate the resource allocation and provisioning minimizes the potential for miscommunication as a result of lack of synchronization (e.g., data staleness and consistency in multi-entity messaging). The inventors also tested different token-based tracking mechanisms, which allowed the inventors to identify methods that could prevent user privacy from being breached by different entities and users.

The use of traditional queue-based allocation models proved to be insufficient for dynamic, multi-phase environments as it failed to support immediate, intermediate allocation and timely reclamation, leading to bottlenecks and resource starvation for urgent tasks. Similarly, manual provisioning approaches did not scale to environments with high request volumes and rapid changes in resource availability, resulting in increased administrative overhead and delayed response times. Further, fixed scheduling algorithms ignored the potential benefits of real-time, demand-driven allocation, generating uncertainty regarding the system's ability to adapt to fluctuating workloads and urgent operational needs.

Thus, the inventors experimented with different methods for real-time, automated resource allocation and reclamation across multiple entities and time periods. For example, the inventors implemented and tested various proxy-based request aggregation techniques, tokenized resource tracking, and automated reclamation protocols to identify the most efficient and effective approaches. Additionally, the inventors systematically evaluated different strategies for balancing load and prioritizing time-sensitive tasks within the shared resource pool.

Techniques are disclosed herein for enabling time-based resource allocation and provisioning. In particular, as described herein, in order to enable users and entities to perform tasks without delay by provisioning and intermediately allocating resources, but ensure that resources are timely available for other users and entities, the system provides a time-based resource allocation system that creates intermediate allocations as a proxy for a first user. By doing so, the first user can provide borrowed resources to entities, e.g., such as applications, to perform time-sensitive tasks. However, the system creates a final allocation of resources from the user to the system, a portion of which is automatically triggered to be provided, such that availability of resources is ensured.

Thus, the environment 100 of FIG. 1 is an illustrative system that can be used for coordinating the transfer and allocation of resources. As an example, responsive to different requests for resources, environment 100 may be used to enable a system to provide resources to various entities as a proxy for a user. For example, environment 100 illustrates exemplary entities, such as entity 150A, entity 150B, through entity 150N (e.g., applications). In particular, if the user requires resources to perform actions at an entity, such as executing tasks, training models, configuring a security patch as payment for one or more different goods and services, and/or the like, but does not have the resources immediately available, the user may request that the time-based allocation system 160 intermediately allocate requested available resources to the target entity. Environment 100 may further include network 140, database 130, and/or user device 180.

Time-based allocation system 160 of environment 100 may execute instructions for performing operations for resource allocation and provisioning. Time-based allocation system 160 may include several subsystems, each configured to perform one or more steps of the methods described herein, such as communication subsystem 162, subset determination subsystem 164, intermediate allocation subsystem 166, resource updating subsystem 168, and final allocation subsystem 170. Time-based allocation system 160 may include software, hardware, or a combination of the two. For example, time-based allocation system 160 may be hosted on a physical server or a virtual server that is running on a physical computer system. In some embodiments, time-based allocation system 160 may be configured on a user device (e.g., a laptop computer, a smartphone, a desktop computer, an electronic tablet, a virtual reality/mixed reality device, or another suitable user device).

As described herein, time-based allocation system 160 may be used to facilitate load balancing and efficient task performance by enabling cross-entity resource sharing. In particular, time-based allocation system 160 may be in communication (e.g., via network 140) with a user and a plurality of different entities (e.g., entity 150A, entity 150B, and entity 150N), which may be executed or accessed through entity-associated operator devices associated with the entities. In the example of environment 100, time-based allocation system 160 is illustrated to be in communication with entity 150A, entity 150B, and entity 150N through network 140.

As described herein, an entity may include a merchant or service platform including a digital or physical infrastructure that provides a set of services, goods, tools, or capabilities to entities (e.g., individual users, businesses, developers, etc.), such as in exchange for resources (e.g., virtual resources, monetary resources, points, etc.). These platforms may facilitate interactions such as transactions, as well as various functionalities. For example, service platforms may include cloud-computing platforms, payment-processing platforms, social media platforms, e-commerce platforms, Internet of Things (IoT) platforms such as smart home systems, or industrial automation platforms.

When a user requires a task to be performed at a target entity, such as entity 150A, but does not have the resources to do so, or is reserving the resources for other purposes (e.g., for tasks with higher priority, higher time-sensitivity, greater anticipated need, etc.), the user may submit one or more requests to the time-based allocation system 160 to provide the resources to the target entity as a proxy for the user, e.g., on the user's behalf. That is, the user may create a request for intermediate allocation to allocation resources from the system, in lieu of the user, to the target entities. In this way, the target entity can perform the task immediately, without delay or lag.

For example, a user may generate and transmit a request using a user device 180, which can include one or more electronic devices such as a laptop, desktop computer, tablet, or mobile phone. The user can interact with the device through multiple input methods, including but not limited to touchscreens, physical keyboards, virtual keyboards, voice commands, or even stylus input. Once the user enters one or more inputs indicating the target entities, the types of resources needed, etc., the device processes the input and transmits the request over a network 140, such as using Wi-Fi, cellular, or wired connections, to the time-based allocation system 160 for further processing.

Alternatively, or additionally, rather than generating and transmitting the request at the user device 180, the request may be generated at an entity-associated device (e.g., POS (point of sale) device), such as when a user attempts to make a request for a task to be performed (e.g., a good to be transferred to the user, a service to be rendered for the user). In some embodiments, the user may use the user-linked resource token at the entity-associated device to trigger generation of a request and cause transfer of the request.

According to some embodiments, the user-linked resource token may be physical (e.g., as opposed to virtual). In particular, the user-linked resource token may include a small chip and an antenna that allow it to communicate wirelessly with the entity-associated device (e.g., POS terminal) when held within a predetermined distance. To initiate request generation, the entity may identify the resources at the entity-associated device and a communication session may be triggered. A user may then hold their user-linked resource token near the entity-associated device, and the token may transmit encrypted payment information, including a unique, one-time code for that specific interaction. Alternatively, or additionally, the user-linked resource token may include a virtual identifier, such as a unique alphanumeric string that uniquely identifies the user at the time-based allocation system 160.

As described herein, communication subsystem 162 of time-based allocation system 160 may be used to receive a plurality of requests for intermediate allocation of a set of resources as a proxy for a user, such as during a first period of time. Communication subsystem 162 may include software components, hardware components, or a combination of both. For example, communication subsystem 162 may include a network card (e.g., a wireless network card and/or a wired network card) that is associated with software to drive the card. Communication subsystem 162 may pass at least a portion of the data, or a pointer to the data in memory, to other subsystems such as subset determination subsystem 164, intermediate allocation subsystem 166, resource updating subsystem 168, and final allocation subsystem 170.

For example, FIG. 2 illustrates an exemplary request 200 for intermediate resource allocation, in accordance with one or more embodiments of this disclosure. Each request may include a corresponding target entity to receive different portions of the intermediate allocation and a user-linked resource token, such as to identify the user requesting the resources, as well as other information. For example, exemplary request 200 includes user-linked resource token "'resourceToken': 'token-jd1111'" and in some implementations may further include a user identifier "'proxyUserId':

'thisisjohndoe'," which uniquely identifies the user at the time-based allocation system 160. The request also includes a timestamp indicating when the request was generated (e.g., "requestTime': '2025-04-11T09:00:00Z'"). The exemplary request also identifies the resources to allocate and the target entity to which the resources should be temporarily allocated. In this case, the exemplary request identifies the target entity as "entity-A" and requests six compute nodes to be intermediately allocated to "entity-A."

The exemplary request 200 may be passed, or a pointer to the data may be passed to the subset determination subsystem 164. For example, as described herein, the system provides a set of resources to the entities so that the target entities are enabled to perform tasks immediately, and without latency, especially where the user does not have the resources available to be able to provide the resources themselves. However, in order to balance loads for processing requests and tasks that come in, the tasks must be able to be split evenly between available resources. Thus, the system automatically transfers available resources of the user upon expiration of a period of time to ensure availability of resources. However, because the user themselves may have anticipated need for resources that become available by the expiration of the period of time, rather than transferring the same amount of resources the user originally requested, the system identifies a subset of the set of resources and automatically triggers transfer of the subset of resources.

The subset determination subsystem 164 is configured to identify the subset of resources to be automatically transferred during expiration of a period of time. In one implementation, the subset determination subsystem 164 may use fractional allocation (e.g., a predetermined fractional allocation), where the subsystem calculates the subset as a fraction of the originally allocated resources. For instance, in the example of exemplary request 200, the user requested for six compute nodes to be intermediately allocated. The subsystem may identify the predetermined fraction allocation as one-third of the resources, and thus determine the subset to be two compute nodes.

In some implementations, the fractional allocation may be user-specific, based on user history such as historical data on the user's past allocation and return patterns. If a user has a record of efficiently utilizing resources and promptly returning unused allocations, the system may reduce the required subset, reflecting a higher level of trust and operational efficiency. Conversely, if a user frequently over-allocates or fails to return unused resources, the subsystem may increase the subset to ensure fairness and discourage resource hoarding.

Additionally, or alternatively, the priority of the task or target entity can influence the subset determination. For high-priority or time-sensitive operations, such as critical security patching, the subsystem may require a larger subset to guarantee that sufficient resources are available for immediate and uninterrupted execution. For lower-priority or non-urgent tasks, a smaller subset may be deemed sufficient, thereby optimizing overall resource utilization. The subsystem may also consider the current state of the shared resource pool. During periods of high demand or limited resource availability, the subset may be increased to expedite the reclamation and redistribution of resources. Conversely, in times of low demand, the system may allow for a reduced subset, providing users with greater flexibility. Other factors that can be incorporated include contractual agreements, user-specific quotas, or predictive analytics that forecast future resource needs based on historical trends and current system load.

In some examples, the subset is a first subset, and the subset determination subsystem 164 may also determine a second subset. For example, the first subset of the set of resources may include resources for which a final allocation of resources from the user is requested when the first period of time is elapsed, whereas the second subset of the set of resources for which the final allocation of resources is not requested when the first period of time is elapsed. The second subset may include the remaining resources after the first subset has been allocated (e.g., the difference between the set and the first subset). In the example of FIG. 2, the set may include six compute nodes, the first subset may include two compute nodes, and the second subset may thus include four compute nodes.

For example, FIG. 3A illustrates an exemplary process for determining subsets of the intermediate resource allocation, in accordance with one or more embodiments of the disclosure. For example, function 300 named "subsetDetermination" receives, as input, parameters such as the set of resources requested by the user for intermediate allocation, e.g., "requestedResource," the time at which the request was made, "requestTime," the user-linked resource token "resourceToken," and the period of time "timePeriod." In the example of FIG. 3A, the subset is determined using a fractional allocation of resources. For example, the function first identifies the number of resources requested by the user and intermediately allocated, e.g., "numberResources=length (requestedResource)." In the example of FIG. 2 and FIG. 3A, the requested resources were input as a list comprising six instances of compute nodes. The number of resources may thus be determined to be six in this example. The function continues to "firstSubset=requestedResource[::(numberResources/3)]" where the function determines the first two resources of the set of resources to be the first subset. The remaining four resources of the set are determined to be in the second subset, e.g., "secondSubset=requestedResource[(number-Resources/3)+1::]."

The function may also include instructions to add the first subset to the resources to be transferred from the user to the system when the period of time is elapsed. For example, the function includes "if time>=(requestTime+timePeriod): resource Token.resources+=firstSubset." In this example, if the predetermined period of time elapses from the time at which the request is generated and/or sent, the final allocation of resources for the resources in the first subset is requested by adding to a list of resources associated with the user-linked resource token (e.g., resourceToken).

Alternatively, or additionally, rather than triggering the final allocation at the elapsing of the period of time from the point in time the intermediate allocation request is generated, the period of time may be independent from the intermediate allocation request generation. In particular, the period of time may be a month, and a specific day of the month may be indicated to be the end of the previous period of time and the start of the next period of time. According to some implementations, the first subset may include a minimum payment due, whereas the second subset includes the remaining balance on the user-linked resource token.

The subsets, request data, and related allocation information may be persistently stored in the database 130 to ensure reliable tracking and future reference throughout the resource allocation lifecycle. When a request for intermediate allocation is processed, the system may record key details, e.g., including the user-linked resource token, the full set of resources requested, the determined first and second subsets, timestamps, and any associated entity or transaction identifiers, and store the data into structured tables or documents within the database.

The subset determination subsystem 164 may pass the subsets, or a pointer in memory to the data, to intermediate allocation subsystem 166, such that the time-based allocation system 160 may transfer, during the first period of time, the set of resources to one or more target entities at one or more corresponding entity-associated storages, e.g., on behalf of the user. For example, the time-based allocation system 160 may allocate or provision its own compute nodes (e.g., six compute nodes) to the target entity, e.g., "entity-A."

In some implementations, the subset determination subsystem 164 may perform authentication of the target entities and verify their permissions, e.g., to ensure that only authorized recipients can receive the resources. After authentication, the resources may be packaged or serialized into a transferable format. For example, a virtual machine might be exported as a Virtual Machine Disk file (VMDK) image, or a dataset might be compressed and encrypted for secure transmission. The system then establishes a secure network path between the source and the target storage, often using protocols such as Secure File Transfer Protocol (SFTP), Secure Copy Protocol (SCP), or cloud-native transfer services like Amazon Web Services (AWS) DataSync or Azure Storage Account replication. Once the connection is established, the resources are transmitted to the target storage, where they can be unpacked, instantiated, or mounted. Throughout the process, integrity checks and logging may be performed to ensure successful delivery and to provide an audit trail.

In the example where the resource is monetary and the entity is a merchant, the time-based allocation system 160 may aggregate all settlements (e.g., resource allocation requests) and, after deducting interchange and network fees, forward the net funds to the entity-specific storage account (e.g., at an acquiring bank). The entity-specific storage may then be credited with the transaction amount. In some instances, one or more processing fees may be deducted from the transaction amount.

According to some implementations, the user or entity may request an intermediate allocation for more resources than are actually expended or otherwise used at the target entities. For example, users often anticipate using more resources than they actually need due to a combination of uncertainty, risk aversion, and practical constraints. When planning for resource allocation, users may lack precise data about future demand or usage patterns. To avoid the risk of running out of resources during unexpected surges or peak periods, the user's request may include a higher count of resources than will be used. Additionally, organizational processes for acquiring more resources can be slow or cumbersome, so users may request more up front to avoid delays later.

Similarly, the entity may anticipate using more resources than actually needed for performing tasks for several reasons. Systems must be designed to handle not only average workloads but also unexpected spikes in demand, hardware failures, or sudden changes in user behavior. Because it is difficult to predict every possible scenario, system architects typically build in extra capacity to ensure stability, performance, and reliability. This over-provisioning helps prevent outages, slowdowns, or degraded service, which could have significant operational or financial consequences. Additionally, as in the environment of FIG. 1, the time-based allocation system 160 often supports multiple applications or users with varying and sometimes unpredictable requirements. Without precise historical data or advanced forecasting tools, entity administrators may err on the side of caution and request/allocate more central processing unit (CPU), memory, storage, or network bandwidth than current usage suggests. Procurement and scaling processes can also be slow or complex, making it more practical to request or deploy additional resources up front rather than risk shortages later.

As a result, once the tasks are initialized and the entities can identify what resources of the intermediately allocated set of resources will be utilized, the entities may send a message indicating that the remaining, unused resources are available so that the system can use them for other tasks for other entities/users. In particular, the communication subsystem 162 may receive, such as during a second period of time occurring after the first period of time, a message from a first target entity indicating a return of at least a portion of the intermediate allocation from an entity-associated storage to the user-linked resource token. The second period of time may, in some implementations, be of a same length as the first period of time but may occur after the first period of time. In some implementations, the first period of time may elapse and trigger the second period of time to begin.

For example, FIG. 3B includes exemplary message 320 from an entity (e.g., entity 150A, entity 150B, entity 150N) indicating a return of resources. In particular, the "return-Message" includes an indication of the target entity that is returning at least a portion of the intermediate allocation. In the example of FIG. 3B, the entity is "entity-A." The return message also identifies the unused resource being returned. In the example of FIG. 3B, the list includes just one compute node; however, in some examples, the list may include more or fewer resources. The return message may also indicate the user-linked resource token, e.g., "resourceToken: 'token-jd1111'," to help the time-based allocation system 160 identify the corresponding request. In some examples, the message may further include an identifier or timestamp to enable identification of the specific intermediate allocation request with which the return message is associated. For example, where a user makes several requests for allocations to the entity "entity-A," a request identifier with which the request data is stored (e.g., at database 130) can be used to identify associated data.

Responsive to receiving the return message, the communication subsystem 162 may pass the return message data, or a pointer to the data in memory, to the resource updating subsystem 168. The resource updating subsystem 168 may update the set of resources to remove the at least a portion of the intermediate allocation returned by the first target entity and further calculate an updated first subset of resources based on the set of resources by removing one or more resources.

For example, the subsystem may query the allocation records, such as the records stored in database 130, to locate data (e.g., one or more entries) corresponding to the user-linked resource token and the specific allocation instance. Using the resource identifiers from the return message, the subsystem marks the returned resources as "available" or removes them from the list of resources currently allocated to the target entity. This may involve updating status fields in the database, such as setting a "state" column from "allocated" to "available," or physically removing resource IDs from an array or set associated with the allocation record. In some implementations, atomic database transactions or distributed locks are used to ensure consistency and prevent race conditions, especially in environments with high concurrency.

After the resource set is updated, the subsystem may recalculate the first subset of resources that will be subject to final allocation from the user. For example, as described herein, the subsystem may apply the system's allocation policy (e.g., such as a fractional rule or a dynamic algorithm) to the new, reduced set of resources. For example, if the policy is to require one-third of the remaining resources, and five compute nodes remain after one is returned, the subsystem computes the new subset as either one or two nodes, depending on rounding rules. This calculation may be performed by a dedicated function or microservice, which receives the updated resource list and returns the indices or IDs of the resources to be included in the first subset.

Figure 4:
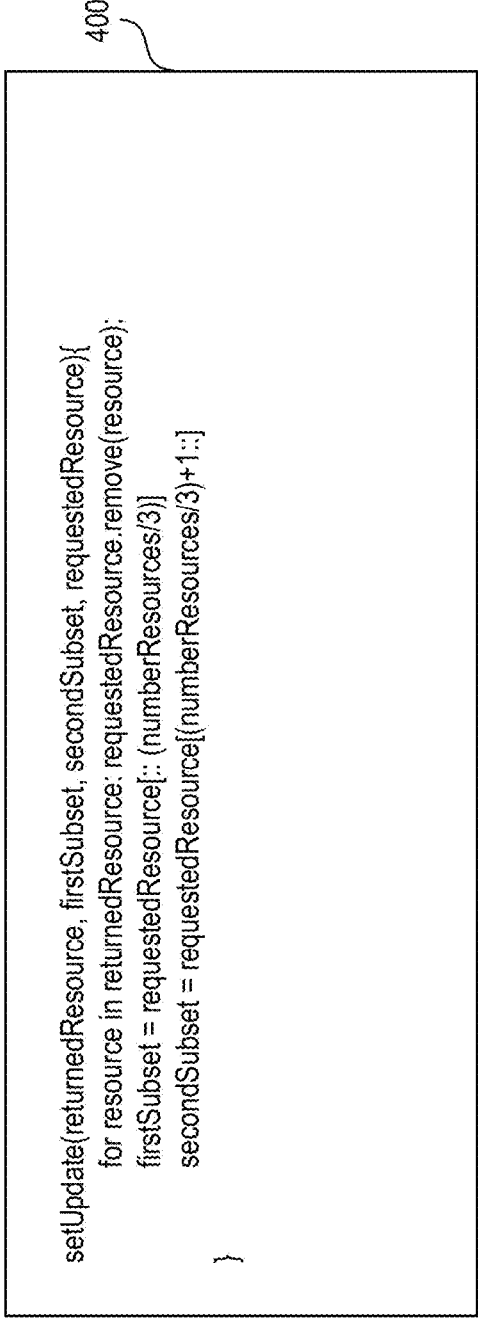
FIG. 4 illustrates an exemplary process for updating the set and first subset of resources, such as based on the returned resources, in accordance with one or more embodiments of the disclosure.

For example, FIG. 4 illustrates an exemplary process for updating the set and first subset of resources, such as based on the returned resources, in accordance with one or more embodiments of the disclosure. The function 400 "setUpdate" takes in inputs such as the returned resources (e.g., extracted from the return message), the current first subset, the current second subset, and the current set of intermediately allocated resources, e.g., "requestedResource." The function may remove each of the returned resources from the intermediate allocation, e.g., "for resource in returnedResource: requestedResource.remove(resource)" and subsequently recalculate the first and second subsets using fractional allocation as described herein.

Once the recalculation is complete, the subsystem updates the allocation record to reflect the new first subset, ensuring that this information is available for the final allocation subsystem 170 when it is time to trigger the user's resource contribution. The subsystem may also log the update event, including details such as the time of the return, the resources affected, and the new allocation state, to an audit log or monitoring system. According to some implementations, the subsystem may send notifications or trigger webhooks to inform other system components or external stakeholders of the updated allocation, ensuring that all parts of the system remain synchronized and that resources can be efficiently reallocated to meet new demands.

When the second period of time has elapsed, the final allocation of the first subset of resources is triggered. In particular, the final allocation subsystem is configured to, responsive to determining that the second period of time is elapsed, automatically transmit a resource allocation command configured to trigger the final allocation of resources of the updated first subset of resources by causing transmission of resources from a user storage associated with the user-linked resource token.

As described herein, a user storage (and entity-associated storage) may refer to a logically or physically defined repository or account that is associated with a specific user/entity (and in some cases a specific user-linked resource token) and is configured to hold, reserve, or manage resources that may be allocated, transferred, or provisioned by the system. User storage may encompass a variety of resource types, including but not limited to computational resources (such as virtual machines, compute nodes, or storage blocks), digital assets (such as tokens, credits, or licenses), or monetary value.

The user storage may be uniquely identified within the system, such as via a user-linked resource token, and is accessible by the system's allocation subsystems for the purpose of executing resource transfers, enforcing allocation policies, and maintaining audit trails. Access to user storage may be governed by configurable parameters, such as access permissions, authentication credentials, and operational status flags, which may be locked or updated according to system-defined buffer periods to ensure transactional integrity and synchronization during critical allocation windows. User storage may be implemented as a dedicated partition in a distributed database, a virtual wallet, a cloud storage bucket, or any other secure, addressable resource container that supports programmatic access and modification by the resource management system.

According to some implementations, when the system determines that the second period of time has elapsed, the final allocation subsystem initiates the process of transferring the updated first subset of resources from the user's storage to the appropriate target entities. Upon expiration of the second period of time, the subsystem may query the database 130 to retrieve the most recent state of the allocation, such as including the user-linked resource token, the updated first subset of resources, and the relevant target entity or entities. This may ensure that any changes resulting from returned or unused resources are accurately reflected in the final allocation.

For example, if the user transfers one or more resources during the second period of time or during the first period of time (e.g., paid the balance or a portion thereof), the system would automatically cause an update to the first subset of resources, e.g., such as to remove one or more resources. The system may also generate and transmit one or more commands for displaying the first subset at the remote user device (e.g., user device 180), e.g., via communication subsystem 162.

Once the data is retrieved, e.g., via communication subsystem 162, the final allocation subsystem may generate a resource allocation command. This command may include the user-linked resource token, identifiers for the specific resources to be transferred, destination information for the target entity, and any required authentication or authorization credentials. The command may be formatted as a structured message or Application Programming Interface (API) call, depending on the architecture of the system. For example, in a cloud environment, the command might be an API request to a resource management service, specifying the transfer of virtual machines, storage blocks, or compute nodes from the user's reserved pool to the target entity's operational environment. The subsystem ensures that all security protocols are followed, such as verifying digital signatures or using secure communication channels (e.g., Transport Layer Security/Secure Sockets Layer (TLS/SSL)), to prevent unauthorized access or tampering during the transfer.

After the command is transmitted, the system orchestrates the actual movement or reassignment of resources. This may involve updating resource ownership records in the central database, initiating data migration processes, or reconfiguring network and access controls to grant the target entity operational control over the newly allocated resources. In some implementations, the final allocation subsystem logs the completion of the allocation event, recording details such as the time of transfer, the resources involved, and the outcome of the operation. Notifications may be sent to both the user and the target entity, confirming that the final allocation has been executed.

If the user storage does not include enough resources to make the final allocation, the system may aggregate the first subset of resources into a next subset corresponding to allocations over a next period of time. Alternatively or additionally, responsive to determining that user storage associated with the user-linked resource token does not comprise at least a portion of the first subset of resources, the system may update the first subset of resources to include additional resources. In the example where the resources are monetary, and the first subset of resources represent a minimum payment, an additional amount of monetary value may be added to the minimum payment, e.g., for which final allocation may be triggered upon expiration of a next period of time.

According to some embodiments, rather than triggering the final allocation automatically upon the expiration of a period of time (e.g., first or second), the user may trigger the final allocation during the first period of time (or during the second period of time). For example, the system may generate and transmit one or more commands for displaying the first subset at a remote user device. Responsive to receiving, from the user device 180, a request for final allocation of the first subset during the first period of time, the system may transmit a resource allocation command configured to trigger the final allocation of resources of the updated first subset of resources by causing transmission of resources from a user storage associated with the user-linked resource token.

According to some implementations, responsive to an initialization of a buffer period of time prior to the elapsing of the second period of time, the system may lock a set of configurable parameters for enabling automatic access of the user storage to prevent updates to a configurable parameter during the buffer period of time. For example, configurable parameters may include an identifier for the user storage and/or an indicator indicating whether the user storage is enabled to be automatically accessed. In particular, configurations such as modifying a bank account from which to automatically access a minimum payment or unsubscribing from automatic payment of minimum payments due during the buffer period (e.g., a day before minimum payment is due) may be prevented and the system may lock these features from being modified during the buffer period to ensure synchronization.

This means that any attempts to modify these parameters, such as changing the linked bank account for automatic payments or disabling automatic payment functionality, are temporarily blocked during the buffer period (e.g., the day before a minimum payment is due). By locking these parameters, the system ensures that no last-minute changes can disrupt the automated resource allocation process, thereby maintaining synchronization between user intent and system actions.

If the system receives, e.g., via communication subsystem 162, a user request to update at least one of the set of configurable parameters during the buffer period of time, the system may prevent such changes from taking place immediately. Responsive to determining that the buffer period of time has elapsed, the system may update at least one of the set of configurable parameters according to the user request. That is, the system queues or defers the requested updates until the buffer period has elapsed and the lock is released. Once the buffer period ends, the system processes any pending user requests and updates the configurable parameters accordingly. This approach guarantees that critical operations, such as the final allocation of resources or automatic payments, are executed based on a stable and consistent configuration, free from the risk of mid-operation changes that could lead to inconsistencies, failed transactions, or security vulnerabilities.

Figure 5:
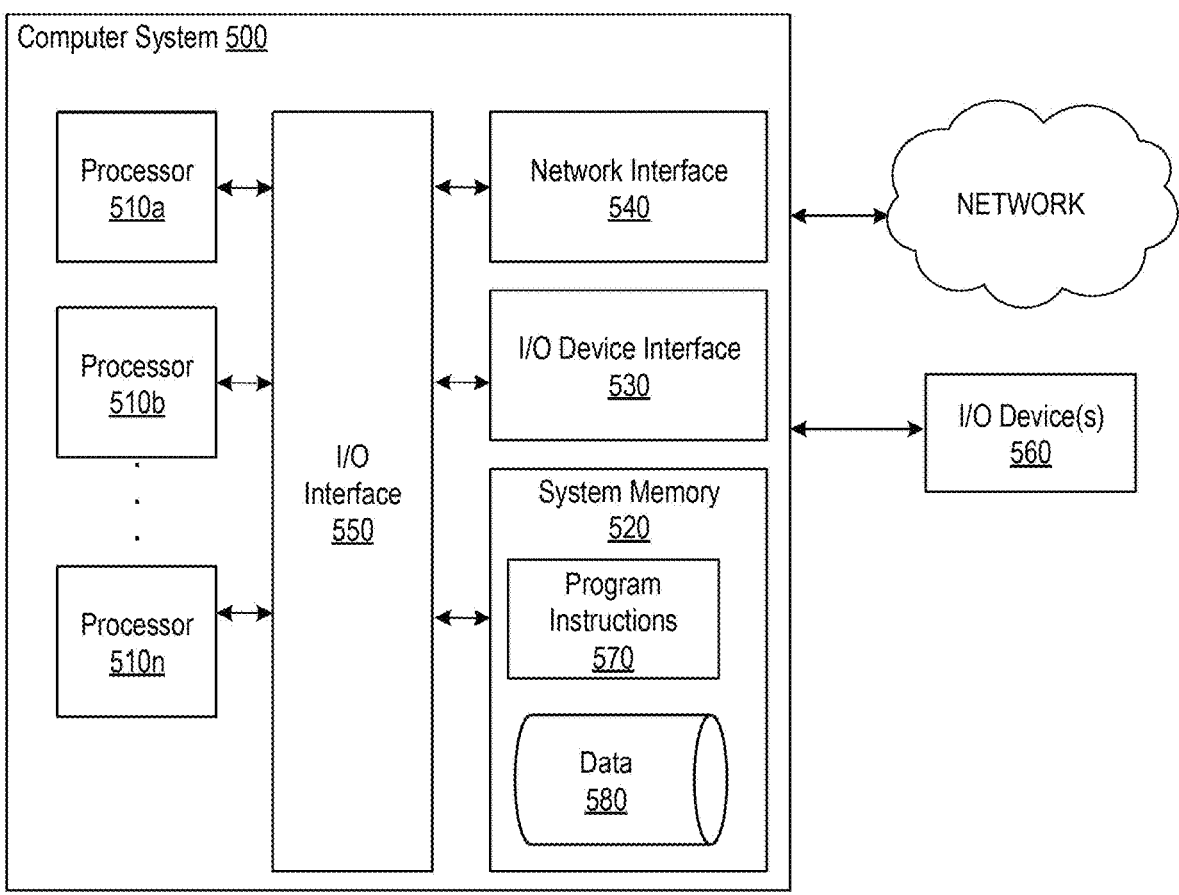
FIG. 5 illustrates a computing system that can be used for time-based resource allocation, in accordance with one or more embodiments of this disclosure.

FIG. 5 shows an example computing system that may be used in accordance with some embodiments of this disclosure. In some instances, computing system 500 is referred to as a computer system 500. A person skilled in the art would understand that those terms may be used interchangeably.

The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a CPU that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 520). Computing system 500 may be a uni-processor system including one processor (e.g., processor 510a), or a multiprocessor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

The I/O device interface 530 and I/O devices 560 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, and/or the like. Alternatively or additionally, the user may use their voice to indicate specific nodes, specific models, and/or the like via the voice recognition device and/or microphones.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a LAN, a WAN, a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages.

A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

FIG. 6 is a flowchart 600 of operations for time-based resource allocation, in accordance with one or more embodiments of this disclosure. The operations of FIG. 6 may use components described in relation to FIG. 5. In some embodiments, time-based allocation system 160 may include one or more components of computer system 500.

At operation 602, one or more of processors 510a-510n may be used to receive a plurality of requests for intermediate allocation of a set of resources as a proxy for a user during a first period of time. For example, each request in the plurality of requests may include (a) a corresponding target entity to receive different portions of the intermediate allocation and (b) a user-linked resource token. One or more of processors 510a-510n may receive such requests over network 140 using network interface 540.

At operation 604, one or more of processors 510a-510n may further determine, from the set of resources, a first subset of the set of resources for which a final allocation of resources from the user is requested when the first period of time is elapsed. Alternatively, or additionally, the system may determine a second subset of the set of resources for which the final allocation of resources is not requested when the first period of time is elapsed.

At operation 606, one or more of processors 510a-510n may transfer, during the first period of time, the set of resources to one or more target entities, such as, for example, at one or more corresponding entity-associated storages. At operation 608, one or more of processors 510a-510n may receive, during a second period of time occurring after the first period of time, a message from a first target entity indicating a return of at least a portion of the intermediate allocation. For example, the processor(s) may receive a message indicating a return from an entity-associated storage to the user-linked resource token.

At operation 610, one or more of processors 510a-510n may update the set of resources. For example, the set may be updated to remove the at least a portion of the intermediate allocation returned by the first target entity. Further, at operation 612, the processor(s) may calculate an updated first subset of resources based on the set of resources. For example, the first subset may be updated by removing one or more resources.

At operation 614, one or more of processors 510a-510n may automatically transmit a resource allocation command configured to trigger the final allocation of resources of the updated first subset of resources. According to some implementations, the automatic transmission may be responsive to determining that the second period of time is elapsed.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method comprising: receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token; determining, from the set of resources, (i) a first subset of the set of resources for which a final allocation of resources from the user is requested when the first period of time is elapsed and (ii) a second subset of the set of resources for which the final allocation of resources is not requested when the first period of time is elapsed; transferring, during the first period of time, the set of resources to one or more target entities at one or more corresponding entity-associated storages; receiving, during a second period of time occurring after the first period of time, a message from a first target entity indicating a return of at least a portion of the intermediate allocation from an entity-associated storage to the user-linked resource token; updating the set of resources to remove the at least a portion of the intermediate allocation returned by the first target entity; calculating an updated first subset of resources based on the set of resources by removing one or more resources; and responsive to determining that the second period of time is elapsed, automatically transmitting a resource allocation command configured to trigger the final allocation of resources of the updated first subset of resources by causing transmission of resources from a user storage associated with the user-linked resource token.

A2. A method comprising: receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token; determining, from the set of resources, a first subset of the set of resources for which a final allocation of resources from the user is requested when the first period of time is elapsed; transferring, during the first period of time, the set of resources to one or more target entities at one or more corresponding entity-associated storages; receiving, during a second period of time occurring after the first period of time, a message from a first target entity indicating a return of at least a portion of the intermediate allocation from an entity-associated storage to the user-linked resource token; updating the set of resources to remove the at least a portion of the intermediate allocation returned by the first target entity; calculating an updated first subset of resources based on the set of resources by removing one or more resources; and responsive to determining that the second period of time is elapsed, automatically transmitting a resource allocation command configured to trigger the final allocation of resources of the updated first subset of resources by causing transmission of resources from a user storage associated with the user-linked resource token.

A3. The method of any of the preceding embodiments, further comprising: determining a second subset of the set of resources for which the final allocation of resources is not requested when the first period of time is elapsed.

A4. The method of any of the preceding embodiments, further comprising: generating and transmitting one or more commands for displaying the first subset of resources at a remote user device; and responsive to receiving, from the remote user device, a request for final allocation of the first subset of resources during the first period of time, transmitting a resource allocation command configured to trigger the final allocation of resources of the updated first subset of resources by causing transmission of resources from a user storage associated with the user-linked resource token.

A5. The method of any of the preceding embodiments, further comprising: responsive to an initialization of a buffer period of time prior to the elapsing of the second period of time, locking a set of configurable parameters for enabling automatic access of the user storage to prevent updates to a configurable parameter during the buffer period of time; receiving, during the buffer period of time, a user request to update at least one of the set of configurable parameters; and responsive to determining that the buffer period of time has elapsed, updating at least one of the set of configurable parameters according to the user request.

A6. The method of any of the preceding embodiments, wherein the set of configurable parameters comprises: an identifier for the user storage; and an indicator indicating whether the user storage is enabled to be automatically accessed.

A7. The method of any of the preceding embodiments, further comprising: responsive to a user transfer of resources, automatically causing an update to the first subset of resources; and generating and transmitting one or more commands for displaying the first subset of resources at the remote user device.

A8. The method of any of the preceding embodiments, further comprising: determining that user storage associated with the user-linked resource token does not comprise at least a portion of the first subset of resources; and updating the first subset of resources to include additional resources.

A9. One or more tangible, non-transitory, computer-readable media storing instructions that, when executed by a data processing apparatus, cause the data processing apparatus to perform operations comprising those of any of embodiments A1-8.

A10. A system comprising: one or more processors; and memory storing instructions that, when executed by the one or more processors, cause the processors to effectuate operations comprising those of any of embodiments A1-8.

A11. A system comprising means for performing any of embodiments A1-8.

A12. A system comprising cloud-based circuitry for performing any of embodiments A1-8.

What is claimed is:

1. A system for transmitting resources based on time intervals, the system comprising:
    one or more processors; and
    one or more memories configured to store instructions that, when executed by the one or more processors, perform operations comprising:
        receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token;
        determining, from the set of resources, (i) a first subset of the set of resources for which a final allocation of resources from the user is requested when the first period of time is elapsed and (ii) a second subset of the set of resources for which the final allocation of resources is not requested when the first period of time is elapsed;
        transferring, during the first period of time, the set of resources to one or more target entities at one or more corresponding entity-associated storages;
        responsive to a user transfer of resources, automatically causing an update to the first subset of the set of resources;
        generating a command for displaying the first subset of the set of resources at a remote user device;
        receiving, during a second period of time occurring after the first period of time, a message from a first target entity indicating a return of at least a portion of the intermediate allocation from an entity-associated storage to the user-linked resource token;
        updating the set of resources to remove at least the portion of the intermediate allocation returned by the first target entity;
        calculating an updated first subset of resources based on the set of resources by removing one or more resources; and
        responsive to determining that the second period of time is elapsed, automatically transmitting a resource allocation command configured to trigger the final allocation of resources of the updated first subset of resources by causing transmission of resources from a user storage associated with the user-linked resource token.

2. The system of claim 1, wherein the instructions further cause the one or more processors to perform operations comprising:

determining that the user storage associated with the user-linked resource token does not comprise any of the first subset of the set of resources; and
updating the first subset of the set of resources to include additional resources.

3. A system comprising:
one or more processors; and
one or more memories configured to store instructions that, when executed by the one or more processors, perform operations comprising:
    receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token;
    determining, from the set of resources, (i) a first subset of the set of resources for which a final allocation of resources from the user is requested when the first period of time is elapsed and (ii) a second subset of the set of resources for which the final allocation of resources is not requested when the first period of time is elapsed;
    transferring, during the first period of time, the set of resources to one or more target entities at one or more corresponding entity-associated storages;
    generating and transmitting one or more commands for displaying the first subset of the set of resources at a remote user device;
    receiving, during a second period of time occurring after the first period of time, a message from a first target entity indicating a return of at least a portion of the intermediate allocation from an entity-associated storage to the user-linked resource token;
    updating the set of resources to remove at least the portion of the intermediate allocation returned by the first target entity;
    calculating an updated first subset of resources based on the set of resources by removing one or more resources; and
    responsive to receiving, from the remote user device, a request for the final allocation of the first subset of the set of resources during the first period of time, transmitting a resource allocation command configured to trigger the final allocation of resources of the updated first subset of resources by causing transmission of resources from a user storage associated with the user-linked resource token.

4. A system comprising:
one or more processors; and
one or more memories configured to store instructions that, when executed by the one or more processors, perform operations comprising:
    receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token;
    determining, from the set of resources, (i) a first subset of the set of resources for which a final allocation of resources from the user is requested when the first period of time is elapsed and (ii) a second subset of the set of resources for which the final allocation of resources is not requested when the first period of time is elapsed;

transferring, during the first period of time, the set of resources to one or more target entities at one or more corresponding entity-associated storages;

receiving, during a second period of time occurring after the first period of time, a message from a first target entity indicating a return of at least a portion of the intermediate allocation from an entity-associated storage to the user-linked resource token;

updating the set of resources to remove at least the portion of the intermediate allocation returned by the first target entity;

calculating an updated first subset of resources based on the set of resources by removing one or more resources;

responsive to determining that the second period of time is elapsed, automatically transmitting a resource allocation command configured to trigger the final allocation of resources of the updated first subset of resources by causing transmission of resources from a user storage associated with the user-linked resource token;

responsive to an initialization of a buffer period of time prior to elapsing of the second period of time, locking a set of configurable parameters for enabling automatic access of the user storage to prevent updates to a configurable parameter during the buffer period of time;

receiving, during the buffer period of time, a user request to update at least one of the set of configurable parameters; and responsive to determining that the buffer period of time has elapsed, updating at least one of the set of configurable parameters according to the user request.

5. The system of claim 4, wherein the set of configurable parameters comprises:

an identifier for the user storage; and an indicator indicating whether the user storage is enabled to be automatically accessed.

6. A method for transmitting resources based on time intervals, the method comprising:

receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token;

determining, from the set of resources, a first subset of the set of resources for which a final allocation of resources from the user is requested when the first period of time is elapsed;

transferring, during the first period of time, the set of resources to one or more target entities at one or more corresponding entity-associated storages;

responsive to a user transfer of resources, automatically causing an update to the first subset of the set of resources;

generating a command for displaying the first subset of the set of resources;

receiving, during a second period of time occurring after the first period of time, a message from a first target entity indicating a return of at least a portion of the intermediate allocation from an entity-associated storage to the user-linked resource token;

updating the set of resources to remove at least the portion of the intermediate allocation returned by the first target entity;

calculating an updated first subset of resources based on the set of resources by removing one or more resources; and responsive to determining that the second period of time is elapsed, automatically transmitting a resource allocation command configured to trigger the final allocation of resources of the updated first subset of resources by causing transmission of resources from a user storage associated with the user-linked resource token.

7. The method of claim 6, further comprising:

determining that the user storage associated with the user-linked resource token does not comprise at least the portion of the first subset of the set of resources; and updating the first subset of the set of resources to include additional resources.

8. The method of claim 6, further comprising determining a second subset of the set of resources for which the final allocation of resources is not requested when the first period of time is elapsed.

9. A method comprising:

receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token;

determining, from the set of resources, (i) a first subset of the set of resources for which a final allocation of resources from the user is requested when the first period of time is elapsed and (ii) a second subset of the set of resources for which the final allocation of resources is not requested when the first period of time is elapsed;

transferring, during the first period of time, the set of resources to one or more target entities at one or more corresponding entity-associated storages;

generating and-transmitting one or more commands for displaying the first subset of the set of resources at a remote user device;

receiving, during a second period of time occurring after the first period of time, a message from a first target entity indicating a return of at least a portion of the intermediate allocation from an entity-associated storage to the user-linked resource token;

updating the set of resources to remove at least the portion of the intermediate allocation returned by the first target entity;

calculating an updated first subset of resources based on the set of resources by removing one or more resources; and responsive to receiving, from the remote user device, a request for the final allocation of the first subset of the set of resources during the first period of time, transmitting a resource allocation command configured to trigger the final allocation of resources of the updated first subset of resources by causing transmission of resources from user storage associated with the user-linked resource token.

10. A method comprising:

receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token;

determining, from the set of resources, (i) a first subset of the set of resources for which a final allocation of resources from the user is requested when the first period of time is elapsed and (ii) a second subset of the set of resources for which the final allocation of resources is not requested when the first period of time is elapsed;

transferring, during the first period of time, the set of resources to one or more target entities at one or more corresponding entity-associated storages;

receiving, during a second period of time occurring after the first period of time, a message from a first target entity indicating a return of at least a portion of the intermediate allocation from an entity-associated storage to the user-linked resource token;

updating the set of resources to remove at least the portion of the intermediate allocation returned by the first target entity;

calculating an updated first subset of resources based on the set of resources by removing one or more resources;

responsive to determining that the second period of time is elapsed, automatically transmitting a resource allocation command configured to trigger the final allocation of resources of the updated first subset of resources by causing transmission of resources from a user storage associated with the user-linked resource token;

responsive to an initialization of a buffer period of time prior to elapsing of the second period of time, locking a set of configurable parameters for enabling automatic access of the user storage to prevent updates to a configurable parameter during the buffer period of time;

receiving, during the buffer period of time, a user request to update at least one of the set of configurable parameters; and responsive to determining that the buffer period of time has elapsed, updating at least one of the set of configurable parameters according to the user request.

11. The method of claim 10, wherein the set of configurable parameters comprises:

an identifier for the user storage; and an indicator indicating whether the user storage is enabled to be automatically accessed.

12. One or more non-transitory, computer-readable storage media storing instructions that when executed by one or more processors cause the one or more processors to perform operations comprising:

receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token;

determining, from the set of resources, a first subset of the set of resources for which a final allocation of resources from the user is requested when the first period of time is elapsed;

transferring, during the first period of time, the set of resources to one or more target entities at one or more corresponding entity-associated storages;

responsive to a user transfer of resources, automatically causing an update to the first subset of the set of resources;

generating a command for displaying the first subset of the set of resources;

receiving, during a second period of time occurring after the first period of time, a message from a first target entity indicating a return of at least a portion of the intermediate allocation from an entity-associated storage to the user-linked resource token;

updating the set of resources to remove at least the portion of the intermediate allocation returned by the first target entity;

calculating an updated first subset of resources based on the set of resources by removing one or more resources; and responsive to determining that the second period of time is elapsed, automatically transmitting a resource allocation command configured to trigger the final allocation of resources of the updated first subset of resources by causing transmission of resources from a user storage associated with the user-linked resource token.

13. The one or more non-transitory, computer-readable storage media of claim 12, wherein the instructions further cause the one or more processors to perform operations comprising:

determining that the user storage associated with the user-linked resource token does not comprise at least the portion of the first subset of the set of resources; and updating the first subset of the set of resources to include additional resources.

14. The one or more non-transitory, computer-readable storage media of claim 12, wherein the instructions further cause the one or more processors to perform operations comprising:

determining a second subset of the set of resources for which the final allocation of resources is not requested when the first period of time is elapsed.

15. One or more non-transitory, computer-readable storage media, storing instructions, that when executed by one or more processors, further cause the one or more processors to perform operations comprising:

receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token;

determining, from the set of resources, (i) a first subset of the set of resources for which a final allocation of resources from the user is requested when the first period of time is elapsed and (ii) a second subset of the set of resources for which the final allocation of resources is not requested when the first period of time is elapsed;

transferring, during the first period of time, the set of resources to one or more target entities at one or more corresponding entity-associated storages;

generating and-transmitting one or more commands for displaying the first subset of the set of resources at a remote user device;

receiving, during a second period of time occurring after the first period of time, a message from a first target entity indicating a return of at least a portion of the intermediate allocation from an entity-associated storage to the user-linked resource token;

updating the set of resources to remove at least the portion of the intermediate allocation returned by the first target entity;

calculating an updated first subset of resources based on the set of resources by removing one or more resources; and responsive to receiving, from the remote user device, a request for the final allocation of the first subset of the set of resources during the first period of time, transmitting a resource allocation command configured to trigger the final allocation of resources of the updated first subset of resources by causing transmission of resources from user storage associated with the user-linked resource token.

16. One or more non-transitory, computer-readable storage media, storing instructions, that when executed by one or more processors, cause the one or more processors to perform operations comprising:

receiving a plurality of requests for intermediate allocation of a set of resources as a proxy for a user during a first period of time, wherein each request in the plurality of requests comprises (a) a corresponding target entity to receive different portions of the intermediate allocation and (b) a user-linked resource token;

determining, from the set of resources, (i) a first subset of the set of resources for which a final allocation of resources from the user is requested when the first period of time is elapsed and (ii) a second subset of the set of resources for which the final allocation of resources is not requested when the first period of time is elapsed;

transferring, during the first period of time, the set of resources to one or more target entities at one or more corresponding entity-associated storages;

receiving, during a second period of time occurring after the first period of time, a message from a first target entity indicating a return of at least a portion of the intermediate allocation from an entity-associated storage to the user-linked resource token;

updating the set of resources to remove at least the portion of the intermediate allocation returned by the first target entity;

calculating an updated first subset of resources based on the set of resources by removing one or more resources;

responsive to determining that the second period of time is elapsed, automatically transmitting a resource allocation command configured to trigger the final allocation of resources of the updated first subset of resources by causing transmission of resources from a user storage associated with the user-linked resource token;

responsive to an initialization of a buffer period of time prior to elapsing of the second period of time, locking a set of configurable parameters for enabling automatic access of the user storage to prevent updates to a configurable parameter during the buffer period of time;

receiving, during the buffer period of time, a user request to update at least one of the set of configurable parameters; and responsive to determining that the buffer period of time has elapsed, updating at least one of the set of configurable parameters according to the user request.

17. The one or more non-transitory, computer-readable storage media of claim 16, wherein the set of configurable parameters comprises:

an identifier for the user storage; and an indicator indicating whether the user storage is enabled to be automatically accessed.

\* \* \* \* \*